(12) United States Patent
Nakano

(10) Patent No.: US 9,847,709 B2
(45) Date of Patent: Dec. 19, 2017

(54) SWITCHED-MODE POWER SUPPLY DEVICE

(71) Applicant: SANKEN ELECTRIC CO., LTD., Niiza-Shi, Saitama (JP)

(72) Inventor: Toshihiro Nakano, Kawagoe (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days.

(21) Appl. No.: 15/273,769

(22) Filed: Sep. 23, 2016

(65) Prior Publication Data

US 2017/0093301 A1 Mar. 30, 2017

(30) Foreign Application Priority Data

Sep. 28, 2015 (JP) ................................. 2015-189330

(51) Int. Cl.
*H02M 1/42* (2007.01)
*H02M 1/00* (2006.01)

(52) U.S. Cl.
CPC .......... *H02M 1/4225* (2013.01); *H02M 1/42* (2013.01); *H02M 2001/0003* (2013.01); *H02M 2001/0012* (2013.01); *Y02B 70/126* (2013.01)

(58) Field of Classification Search
CPC ................. H02M 1/4225; H02M 1/42; H02M 2001/0012
See application file for complete search history.

(56) References Cited

U.S. PATENT DOCUMENTS

| 6,448,745 | B1 | 9/2002 | Killat | |
|---|---|---|---|---|
| 2008/0205103 | A1* | 8/2008 | Sutardja | G05F 1/70 363/84 |
| 2012/0014148 | A1* | 1/2012 | Li | H02M 1/4216 363/78 |
| 2016/0020692 | A1* | 1/2016 | Castelli | H02M 1/4208 363/89 |

* cited by examiner

*Primary Examiner* — Timothy J Dole
*Assistant Examiner* — Ishrat Jamali
(74) *Attorney, Agent, or Firm* — Metrolexis Law Group, PLLC

(57) ABSTRACT

A switched-mode power supply device that rectifies and smoothes a direct input voltage to obtain a predetermined output voltage is disclosed. A series circuit includes a reactor and a switching element and the circuit switches the direct input voltage. An OFF time calculator calculates an OFF time of the switching element based on the direct input voltage, the output voltage, and an ON time of the switching element calculated based on the output voltage and a reference value. A frequency calculator calculates at least one of a period and a frequency based on the OFF time calculated by the OFF time calculator and the ON time. A controller that controls switching of the switching element based on a result of comparison between one of the period and the frequency, and a corresponding one of a reference period and the reference frequency.

7 Claims, 4 Drawing Sheets

SWITCHED-MODE POWER SUPPLY DEVICE

CROSS REFERENCE TO RELATED APPLICATIONS

This application claims priority under 35 U.S.C. §119 from prior Japanese Patent Application No. 2015-189330 filed on Sep. 28, 2015, entitled "SWITCHED-MODE POWER SUPPLY DEVICE", the entire contents of which are hereby incorporated herein by reference.

BACKGROUND

The disclosure relates to a switched-mode power supply device, the switching frequency of which varies with load, and particularly to a technique of reducing switching loss of the switched-mode power supply device under light load.

A power factor improvement circuit described in U.S. Pat. No. 6,448,745 (Patent Document 1) is known as a switched-mode power supply device of the prior art. This power factor improvement circuit is intended to improve a power factor when running in a discontinuous mode, and includes a controller which inputs an input voltage and an output voltage.

Based on the input voltage, the output voltage, and an ON time of a switching element, the power factor improvement circuit calculates an OFF time during which a current through a reactor will decrease from its peak to zero and performs ON-OFF control of the switching element using ON and OFF signals of the ON time and the OFF time.

SUMMARY

One or more embodiments provide a switched-mode power supply device that rectifies and smoothes a direct input voltage to obtain a predetermined output voltage, which comprises a series circuit including a reactor and a switching element, that switches the direct input voltage; an OFF time calculator that calculates an OFF time of the switching element based on the direct input voltage, the output voltage, and an ON time of the switching element calculated based on the output voltage and a reference value; a frequency calculator that calculates at least one of a period and a frequency based on the OFF time calculated by the OFF time calculator and the ON time; and a controller that controls switching of the switching element based on a result of comparison between one of the period and the frequency, and a corresponding one of a reference period and the reference frequency.

DETAILED DESCRIPTION

One or more embodiments of switched-mode power supply devices are hereinbelow described in detail with reference to the drawings.

Embodiment 1

Figure 1:
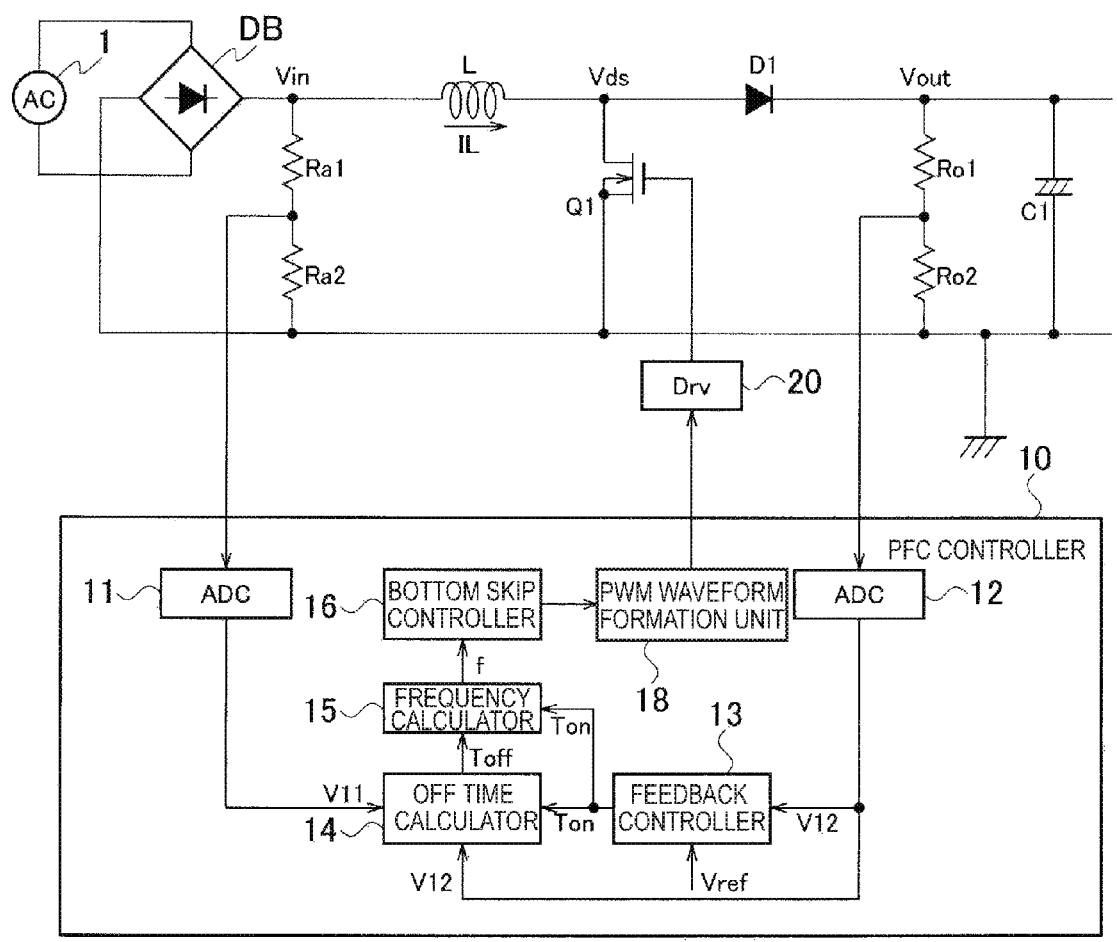
FIG. 1 is a circuit diagram illustrating a switched-mode power supply device in accordance with one or more embodiments.

FIG. 1 is a circuit diagram of a switched-mode power supply device in one or more embodiments. Full wave rectification circuit DB, which may be a switched-mode power supply device as illustrated in FIG. 1, fully rectifies an alternate voltage from alternate power supply 1 to output full wave rectified voltage Vin to both ends of a series circuit including resistor Ra1 and resistor Ra2. A circuit such as a battery, which includes alternate power supply 1 and full wave rectification circuit DB, may be used as a direct current power supply which outputs a direct input voltage.

A series circuit including reactor L and switching element Q1 is electrically connected to both ends of the series circuit including resistor Ra1 and resistor Ra2. Switching element Q1 contains a MOSFET, and a series circuit including diode D1 and capacitor C1 is electrically connected between a drain and a source of switching element Q1. A series circuit including resistor Ro1 and resistor Ro2 is electrically connected to both ends of capacitor C1.

The switched-mode power supply device rectifies the alternate voltage from alternate power supply 1 and converts the thus-rectified alternate voltage to the direct input voltage. Then, the switched-mode power supply device performs switching on the direct input voltage via the series circuit including reactor L and switching element Q1. The voltage thus obtained is rectified and smoothed by a rectifying and smoothing circuit including diode D1 and capacitor C1, and thereby predetermined output voltage Vout is obtained.

PFC controller 10 performs ON-OFF control of switching element Q1 based on direct input voltage Vin between resistor Ra1 and resistor Ra2, output voltage Vout between resistor Ro1 and resistor Ro2, and the ON time of switching element Q1. This makes it possible to set the output voltage to the predetermined value and to improve a power factor. PFC controller 10 may be one or more microcontroller units (MCUs), which have components to be described later integrated on semiconductor chips.

PFC controller 10 of one or more embodiments includes analog-to-digital converters (ADCs) 11 and 12, feedback controller 13, OFF time calculator 14, frequency calculator 15, bottom skip controller 16, and PWM waveform formation unit 18.

ADC 11 converts a voltage, which is a fraction of full wave rectified voltage Vin divided by resistor Ra1 and resistor Ra2, to digital value V11, and outputs digital value V11 to OFF time calculator 14.

ADC 12 converts a voltage, which is a fraction of output voltage Vout divided by resistor Ro1 and resistor Ro2, to digital value V12, and outputs digital value V12 to feedback controller 13 and OFF time calculator 14.

Figure 3:
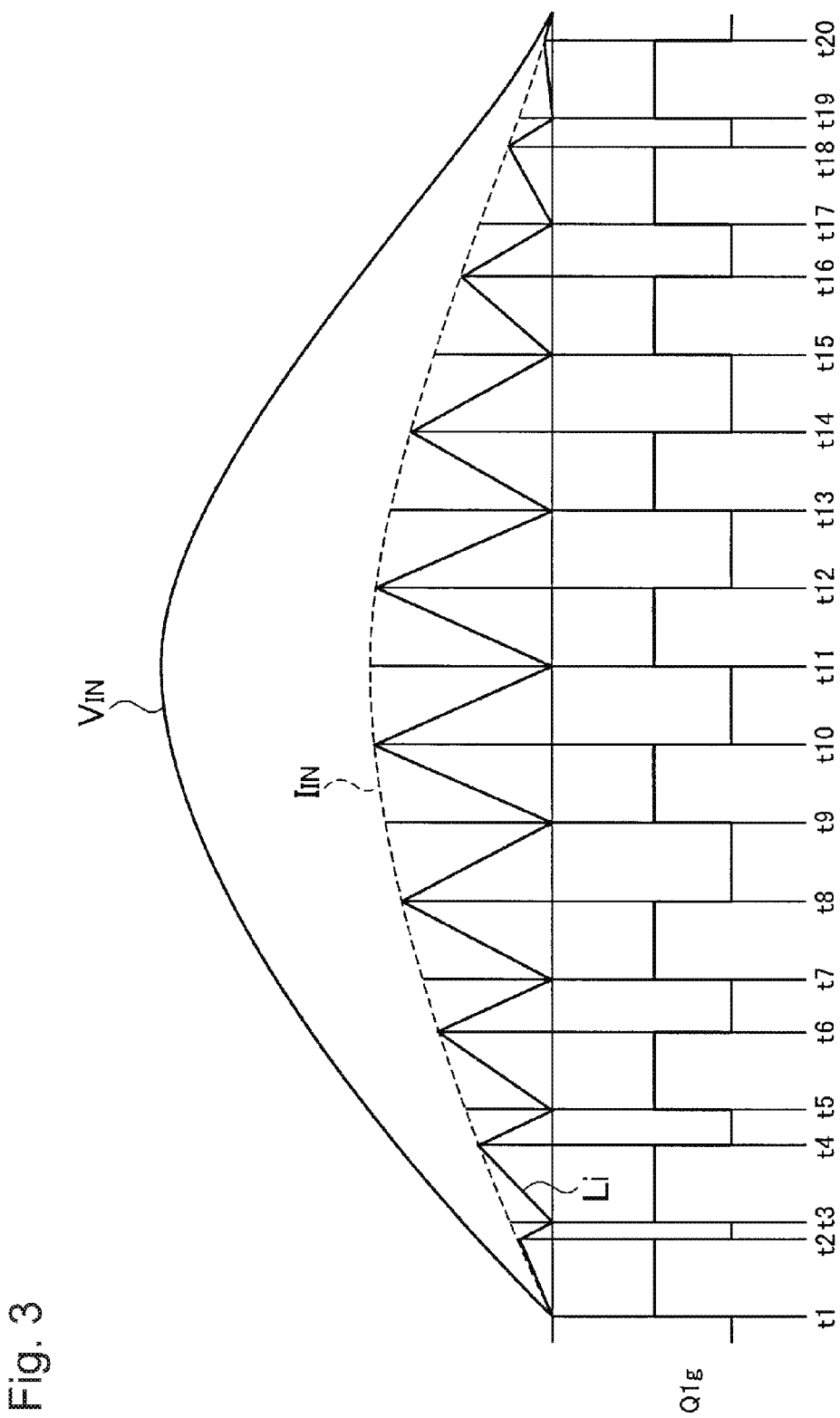
FIG. 3 is a timing chart illustrating control of quasi-resonance and bottom skip of the switched-mode power supply device in accordance with one or more embodiments.

Feedback controller 13 calculates the ON time of switching element Q1 in the next switching period, on the basis of an error between reference value Vref and digital value V12 based on output voltage Vout from ADC 12. The ON time control is performed through proportional integral (PI) control. As illustrated in FIG. 3, a delayed response time makes the ON times (e.g. time t1-t2, time t3-t4) constant over one period of direct input voltage Vin.

This makes it possible to achieve an improved power factor because the average of input current IIN has an expression proportional to direct input voltage Vin.

OFF time calculator 14 calculates OFF time Toff of switching element Q1 in the next switching period, based on ON time Ton of switching element Q1, direct input voltage Vin, and output voltage Vout.

Calculation processing of OFF time calculator 14 of step-up switching element Q1 in a critical mode (a mode in which a current flowing through reactor L becomes zero) is described in detail. When the ON time is denoted by Ton, peak Ip of the current flowing through reactor L is obtained by expression (1):

$$Ip = Vin \times Ton / L \qquad (1),$$

where Vin is the direct input voltage and L is an inductance value.

When the peak of the current is Ip, OFF time Toff to operate in the critical mode is obtained by expression (2):

$$Ip - (Vout - Vin) \times Toff / L = 0 \qquad (2)$$

$$Ip = (Vout - Vin) \times Toff / L$$

$$\begin{aligned} Toff &= Ip / (Vout - Vin) / L \\ &= (Vin \times Ton / L) / (Vout - Vin) / L \\ &= (Vin \times Ton) / (Vout - Vin). \end{aligned}$$

From expression (2), the timing at which the reactor current becomes zero is determined by the difference between direct input voltage Vin and output voltage Vout, peak value Ip of the current, and inductance value L. Here, peak value Ip of the current in the critical mode is determined by direct input voltage Vin, ON time Ton, and inductance value L.

Thus, the timing at which the reactor current becomes zero can be obtained from direct input voltage Vin, output voltage Vout, and ON time Ton.

OFF time calculator 14 can therefore calculate the OFF time of switching element Q1 by obtaining the timing at which the reactor current becomes zero, using ON time Ton of switching element Q1, direct input voltage Vin, and output voltage Vout. As a result, operation in the current critical mode is possible without use of a coil or a current sensor.

Frequency calculator 15 is an example of a calculator and calculates switching frequency f of switching element Q1 based on switching period T of switching element Q1, which is the sum of the OFF time and the ON time calculated by OFF time calculator 14.

Bottom skip controller 16 is an example of a controller and controls switching element Q1 based on the result of comparison between frequency f and the reference frequency. Bottom skip controller 16 performs calculation of estimating the bottom timing in a damped oscillation of voltage Vds across switching element Q1 (voltage between the drain and the source) in an off state. If the frequency calculated by frequency calculator 15 exceeds the reference frequency, bottom skip controller 16 generates a signal to skip once at the first estimated bottom timing and to turn on switching element Q1 when the next bottom timing is reached.

PWM waveform formation unit 18 generates a PWM signal based on the signal from bottom skip controller 16, and outputs the thus-generated PWM signal to the gate of switching element Q1 via driver (Drv) 20.

Subsequently, operation of the switched-mode power supply device of one or more embodiments as configured above is described in detail with reference to the timing chart illustrated in FIG. 2.

Figure 2:
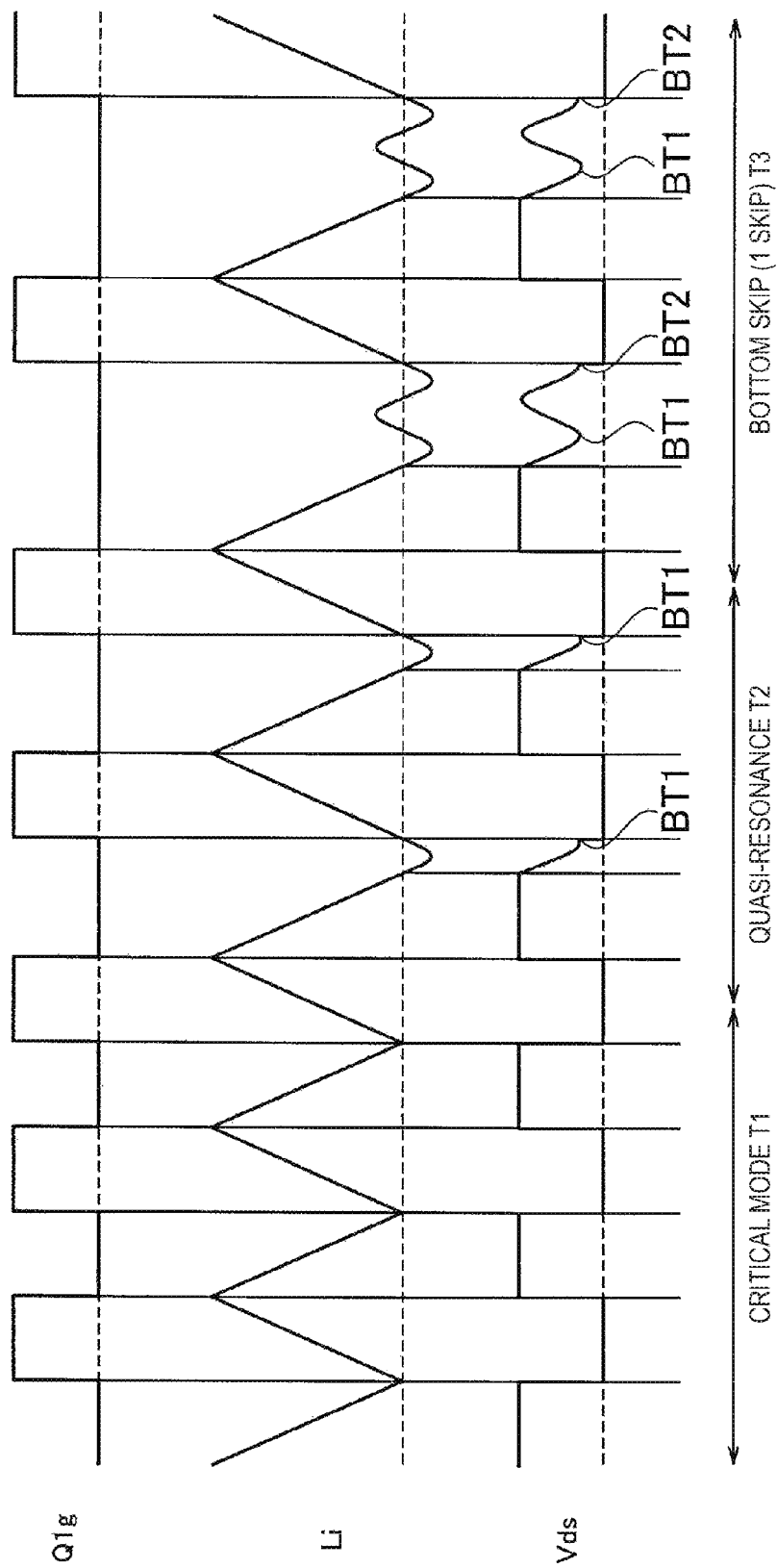
FIG. 2 is a chart illustrating waveforms of a direct input voltage and an input current of the switched-mode power supply device in accordance with one or more embodiments.

In FIG. 2, Q1g denotes the gate voltage of switching element Q1, Li denotes the current flowing through reactor L, and Vds denotes the voltage between the drain and the source of switching element Q1.

First, in critical mode T1, PFC controller 10 sets the on-duty cycle to approximately 50% and turns on and off switching element Q1. In this case, operation in the critical mode is possible without use of a coil or a current sensor, since OFF time calculator 14 calculates the OFF time of switching element Q1 based on the ON time of switching element Q1, direct input voltage Vin, and output voltage Vout.

Next, in quasi-resonance mode T2, bottom skip controller 16 turns on switching element Q1 when first bottom timing BT1 is reached, at which the damped oscillation of voltage Vds between the drain and the source reaches its minimum while switching element Q1 is off, as illustrated in FIG. 2.

In this case, the OFF time can be set to a sum of the OFF time of the critical mode and a time required for voltage Vds between the drain and the source to reach bottom timing BT1. Thus, it is possible to reduce the switching loss.

Next, bottom skip (1 skip) T3 is performed when the frequency calculated by frequency calculator 15 exceeds the reference frequency. More specifically, in bottom skip T3, bottom skip controller 16 skips once at first bottom timing BT1 estimated by calculation, and turns on switching element Q1 when next bottom timing BT2 is reached. In this case, the OFF time can be set to a sum of the OFF time of the critical mode and the time required for voltage Vds to reach second bottom timing BT2 or later. Hence, it is possible to restrict the maximum frequency of switching element Q1 by precisely switching the control modes, and thereby to reduce the switching loss resulting from the increase in oscillation frequency under light load.

Embodiment 2

Figure 4:
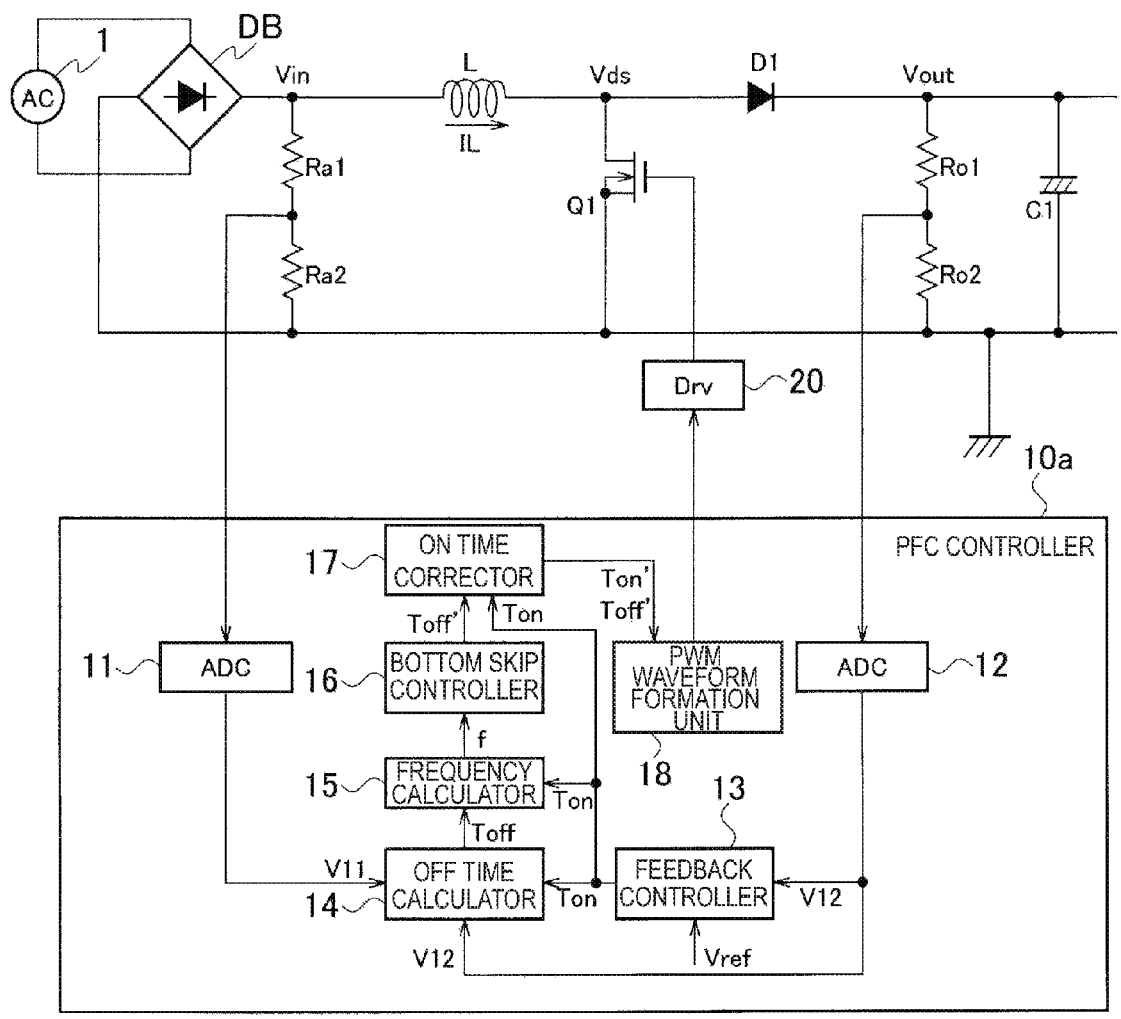
FIG. 4 is a circuit diagram illustrating a switched-mode power supply device in accordance with one or more alternative or additional embodiments.

FIG. 4 is a circuit diagram of a switched-mode power supply device of one or more alternative or additional embodiments. The switched-mode power supply device in accordance with one or more alternative or additional embodiments is a power factor improvement circuit, which may include the power factor improvement circuit in accordance with some embodiments further provided with an ON time corrector 17. When one bottom is skipped and the OFF time is extended by bottom skip controller 16, ON time corrector 17 corrects the ON time depending on the extended OFF time.

As above, according to the switched-mode power supply device in one or more alternative or additional embodiments, when one bottom is skipped and the OFF time is extended by bottom skip controller 16, ON time corrector 17 corrects the ON time such that the ON time is extended depending on the extended OFF time.

Correcting and extending the ON time makes it possible to suppress the deformation of waveforms of current and voltage because the change in the on-duty cycle can be suppressed even in the case where the OFF time is extended. Improvement of the power factor at bottom skipping can be achieved as a result. In addition, if the load is an LED, its flickering can be reduced.

Note that the invention is not limited to the switched-mode power supply devices of the embodiments disclosed herein. In the description of the switched-mode power supply devices of the various disclosed embodiments, a step-up switched-mode power supply device is adopted. The invention is, however, applicable to a step-down switched-mode power supply device, for example.

In this case, calculation processing of the OFF time by the OFF time calculator during operation in the critical mode is as follows. When the ON time is denoted by Ton, peak Ip of the current flowing through reactor L is obtained by expression (3):

$$Ip=(Vin-Vout) \times Ton/L \qquad (3).$$

When the peak of the current is Ip, OFF time Toff to operate in the critical mode is obtained by expression (4):

$$Ip - Vout \times Toff / L = 0 \qquad (4)$$
$$Ip = Vout \times Toff / L$$
$$Toff = Ip \times L / Vout$$
$$= (Vin - Vout) \times Ton \times L / (Vout \times L)$$
$$= (Vin - Vout) \times Ton / Vout.$$

From expression (4), the timing at which the reactor current becomes zero can be obtained from direct input voltage Vin, output voltage Vout, and ON time Ton.

OFF time calculator 14 can therefore calculate the OFF time of switching element Q1 by obtaining the timing at which the reactor current becomes zero, using ON time Ton of switching element Q1, direct input voltage Vin, and output voltage Vout. As a result, operation in the current critical mode is possible without use of a coil or a current sensor.

In addition, the invention is applicable to a DC-to-DC converter including no power factor improvement circuit as long as the switching frequency varies with load.

Moreover, the invention may be configured to control the switching element based on the result of comparison between the switching period and the reference period instead of the result of comparison between the switching frequency and the reference frequency.

Furthermore, the bottom timing in the damped oscillation of voltage Vds across switching element Q1 may be estimated by calculation, but alternatively may be set to a fixed value by an internal function of PFC controller 10 or be detected based on voltage Vds or current IL. The bottom timing may also be obtained using a combination of these methods.

In the case of the switched-mode power supply device described in Patent Document 1, there remains a problem of increased switching loss resulting from a high frequency of the switching element under light load. Such a problem is not specific to a power factor improvement circuit, but is common to various types of switched-mode power supply devices.

According to the embodiment described above, the switching frequency is calculated on the basis of at least one of the period and the frequency based on the ON time and the OFF time of the switching element. Then, the switching element is controlled based on the result of comparison between the switching frequency and a corresponding one of the reference period and the reference frequency.

Hence, is possible to precisely control the switching element based on at least one of the switching period and the switching frequency, and thereby to reduce the switching loss resulting from the increase in oscillation frequency under light load.

As has been described above, the embodiments can provide a switched-mode power supply device capable of reducing switching loss under light load.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A switched-mode power supply device that converts a direct input voltage to obtain a predetermined output voltage, comprising: a series circuit including a reactor and a switching element, that switches the direct input voltage;
   an OFF time calculator that calculates an OFF time of the switching element based on the direct input voltage, the output voltage, and an ON time of the switching element calculated based on the output voltage and a reference value;
   a frequency calculator that calculates at least one of a period and a frequency based on the OFF time calculated by the OFF time calculator and the ON time; and
   a controller that controls switching of the switching element based on a result of comparison between one of the period and the frequency, and a corresponding one of a reference period and a reference frequency.

2. The switched-mode power supply device of claim 1, wherein
   the controller restricts a maximum frequency of the switching element if the frequency exceeds the reference frequency.

3. The switched-mode power supply device of claim 1, wherein
   the controller extends the OFF time of the switching element if the frequency exceeds the reference frequency.

4. The switched-mode power supply device of claim 3, further comprising:
   an ON time corrector that, when the OFF time is extended by the controller, corrects the ON time depending on the extended OFF time.

5. The switched-mode power supply device of claim 3, wherein
   the controller performs calculation of estimating a bottom in a damped oscillation of a voltage across the switching element in an off state, and if the frequency calculated by the frequency calculator exceeds the reference frequency, the controller skips once at the first estimated bottom, and turns on the switching element when a next bottom is reached.

6. The switched-mode power supply device of claim 5, wherein
   the controller causes the switching element to perform quasi-resonance by turning on the switching element when the first bottom estimated by the controller is reached.

7. The switched-mode power supply device of claim 6, further comprising:

an ON time corrector that, when the bottom is skipped and the OFF time is extended by the controller, corrects the ON time depending on the extended OFF time.

* * * * *